United States Patent
Glickman et al.

(10) Patent No.: US 8,452,553 B2
(45) Date of Patent: May 28, 2013

(54) DEVICE AND METHOD FOR TESTING A CIRCUIT

(75) Inventors: Eran Glickman, Reshon Letzion (IL); Yaron Alankry, Ra'anana (IL); Erez Arbel-Meirovich, Yahud (IL); Erez Parnes, Petah-Tikva (IL)

(73) Assignee: Freescale Semiconductor, Inc., Austin, TX (US)

( * ) Notice: Subject to any disclaimer, the term of this patent is extended or adjusted under 35 U.S.C. 154(b) by 219 days.

(21) Appl. No.: 12/516,319

(22) PCT Filed: Nov. 30, 2006

(86) PCT No.: PCT/IB2006/054526
§ 371 (c)(1),
(2), (4) Date: May 26, 2009

(87) PCT Pub. No.: WO2008/065480
PCT Pub. Date: Jun. 5, 2008

(65) Prior Publication Data
US 2010/0114508 A1    May 6, 2010

(51) Int. Cl.
*G01R 31/00*   (2006.01)
(52) U.S. Cl.
USPC ............................ 702/58; 702/119; 702/125
(58) Field of Classification Search
USPC ............ 702/58, 119, 125; 369/60.01; 714/32, 714/33, 724–744
See application file for complete search history.

(56) References Cited

U.S. PATENT DOCUMENTS

| | | | | |
|---|---|---|---|---|
| 5,444,717 A * | 8/1995 | Rotker et al. | | 714/744 |
| 5,519,715 A * | 5/1996 | Hao et al. | | 714/727 |
| 5,617,431 A * | 4/1997 | Tupuri et al. | | 714/738 |
| 5,995,744 A | 11/1999 | Guccione | | |
| 6,003,142 A | 12/1999 | Mori | | |
| 6,023,570 A | 2/2000 | Tang et al. | | |
| 6,055,649 A | 4/2000 | Deao et al. | | |
| 6,212,650 B1 | 4/2001 | Guccione | | |
| 6,370,665 B1 * | 4/2002 | Noguchi | | 714/738 |
| 6,389,321 B2 | 5/2002 | Tang et al. | | |
| 6,633,922 B1 | 10/2003 | Brock et al. | | |
| 6,665,701 B1 | 12/2003 | Combs et al. | | |
| 7,058,693 B1 | 6/2006 | Baker, Jr. | | |
| 2001/0033243 A1 | 10/2001 | Harris et al. | | |

(Continued)

FOREIGN PATENT DOCUMENTS

| | | |
|---|---|---|
| EP | 1346541 A1 | 9/2003 |
| JP | 06052003 A | 5/2009 |
| WO | 0232075 A1 | 4/2002 |
| WO | 2004073295 A2 | 8/2004 |

*Primary Examiner* — Jonathan C Teixeira Moffat
*Assistant Examiner* — Timothy H Hwang

(57) ABSTRACT

A device and a method. The device includes: (i) a processor, connected to the receiver, (ii) an interface adapted to receive a test vector and to output a test response, the test vector includes a first group of signals that include idle signals and at least one information frame and a second group of signals that include timing signals and data signals; and (iii) a receiver, connected to the interface. The receiver is adapted to receive the first group of signals and filter out the idle signals and at least one instruction frame delimiters to provide at least one instruction. The device is adapted to send the at least one instruction to at least one instruction buffer. The processor is adapted to execute at least one instruction stored in the at least one instruction buffer and to respond to the second group of signals such as to provide test responses.

20 Claims, 7 Drawing Sheets

U.S. PATENT DOCUMENTS

| | | |
|---|---|---|
| 2002/0046239 A1 | 4/2002 | Stawikowski et al. |
| 2003/0009307 A1* | 1/2003 | Mejia et al. .................. 702/125 |
| 2004/0034439 A1 | 2/2004 | Watson |
| 2004/0193986 A1* | 9/2004 | Canagasaby et al. ......... 714/738 |
| 2004/0198251 A1 | 10/2004 | Fitzgibbon |
| 2004/0213384 A1 | 10/2004 | Alles et al. |
| 2005/0052423 A1 | 3/2005 | Harris et al. |
| 2005/0144601 A1 | 6/2005 | Lo |
| 2005/0168071 A1 | 8/2005 | Durbin et al. |
| 2005/0249132 A1 | 11/2005 | Galich et al. |
| 2006/0126537 A1 | 6/2006 | Booth |
| 2008/0243462 A1* | 10/2008 | Guenther et al. ............... 703/15 |

* cited by examiner

DEVICE AND METHOD FOR TESTING A CIRCUIT

FIELD OF THE INVENTION

The present invention relates to devices, to testers, and to method for testing a tested device.

BACKGROUND OF THE INVENTION

Modern integrated circuits are getting more and more complex. In order to evaluate the functionality of integrated circuits various testing techniques were developed.

Testers inject test vectors that include timing signals and data signals to a tested device (also known as device under test or DUT), receive a test response from the tested device and evaluate the functionality of the tested device by analyzing the test response. The test vector is usually very long and can be represented by a two dimensional matrix. The rows of the matrix represent different points in time (different samples) while the columns of the matrix represent input signals.

The test vectors are usually very long, as modern integrated circuit (and especially multiple core integrated circuits) include many pins and can receive a large number of signals over relatively long periods.

Test vectors are usually generated by a pattern generator in response to the expected functionality of the tested device, in response to a simulation of the tested device, and the like. Testing communication controllers usually involves generating a test vector by simulating another communication controller that exchanges many signals with the tested communication controller.

The test vectors are very long and usually cannot be updated on-the fly, as they represent the simulated response of a highly complex simulation. In many cases a change in a test vector is a highly complex and long process during which there is a need to update the model that forms the basis of the pattern generation. In addition, a requested test vector change should be checked in order to prevent damages to the tested circuit or a provision of prohibited (or invalid) test signal combinations.

This robust approach does not necessarily meet the dynamic environment of modern integrated circuit vendors and clients. In many cases the demands from a device can change rapidly and there is a need to provide an efficient method and device for testing a device.

SUMMARY OF THE PRESENT INVENTION

A device and a method for testing a device, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 1:
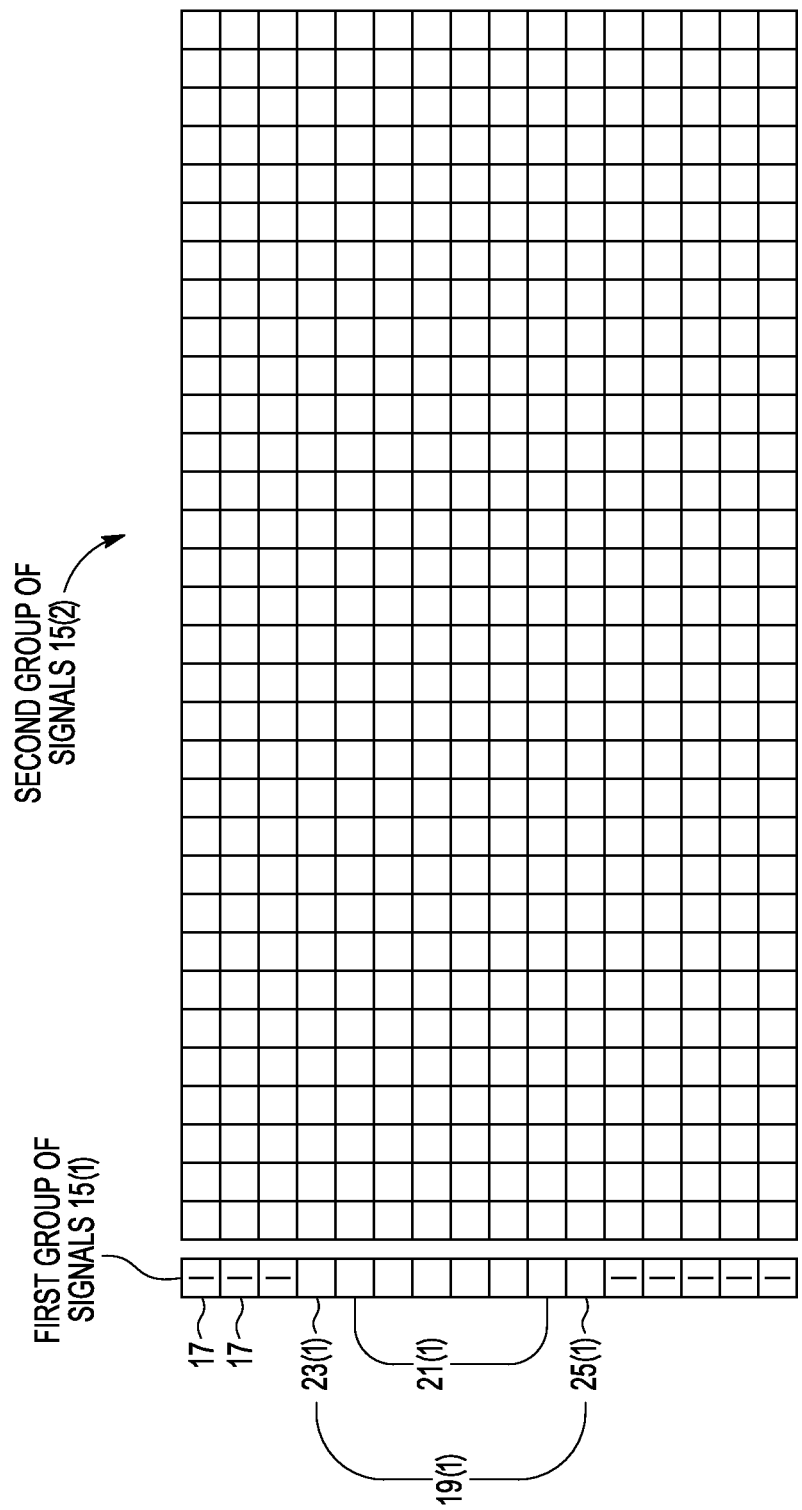
FIG. 1 illustrates a test vector according to an embodiment of the invention.

According to an embodiment of the invention a device and method are provided. A device is tested by a test vector that includes a first group of signals and a second group of signals. The first group of signals includes idle signals at one or more instruction frames. This one or more instruction frames as well as the location of the instructions can dynamically be changed. Conveniently, instructions are stored in instruction buffers associated with instruction buffer descriptors. Conveniently, data signals that belong to the second group of signals are stored in data buffers associated with data buffer descriptors.

According to an embodiment of the invention a device is provided. The device includes a processor, a receiver, a transmitter, at least two (one for transmit and one for receive) instruction buffer and an interface. The interface is adapted to receive a test vector and to output a test response. The test vector includes a first group of signals and a second group of signals. The first group of signals includes idle signals and at least one information frame. The second group of signals includes timing signals and data signals. The receiver is connected to the interface and is adapted to receive the first group of signals and filter out the idle signals and at least one instruction frame delimiters to provide at least one instruction. The device is adapted to send at least one instruction to at least one instruction buffer. The processor is adapted to execute at least one instruction stored in the at least one instruction buffer and to respond to the second group of signals such as to provide a test response, the transmitter is connected to the interface and is adapted to transmit the result of at least one instruction.

According to an embodiment of the invention a tester is provided. The tester includes a pattern generator that is adapted to generate a second group of signals that includes timing signals and data signals. The tester further an interface that is adapted to receive information representative of at least one instruction, and a controller that is adapted to control a provision of a test vector to a tested device. The test vector includes the second group of signals and a first group of signals. The first group of signals includes idle signals and at least one information frame. The controller is adapted to evaluate a test response received from the tested device in response to the test vector provided to the tested device.

According to an embodiment of the invention a method is provided. The method includes: (i) Receiving a test vector. The test vector includes a first group of signals that includes idle signals and at least one information frame and a second group of signals that includes timing signals and data signals. (ii) Filtering out, by a receiver, idle signals and at least one instruction delimiters to provide at least one instruction. (iii) Sending the at least one instruction to at least one instruction buffer. (iv) Generating a test response by executing the at least one instruction and by responding to the second group of signals. (v) Outputting a test response.

According to an embodiment of the invention a method is provided. The method includes: (i) Receiving information representative of at least one instruction. (ii) Generating a second group of signals that comprises timing signals and data signals. (iii) Generating a test vector that includes the second group of signals and a first group of signals that includes idle signals and at least one information frame. The first group of signals is responsive to the information representative of at least one instruction. (iv) Providing the test vector to the tested device. (v) Evaluating a test response received from the tested device in response to the provision of the test vector.

Conveniently, instructions are stored in instruction buffers associated with instruction data buffers FIG. 1 illustrates test vector 15 according to an embodiment of the invention. Test vector 15 includes a first group of signals 15(1) and a second group of signals 15(2). The first group of signals 15(1) can include multiple idle signals "I" 17 and one or more instruction frames such as instruction frame 19(1). Instruction frame 19(1) can include an instruction 21(1) and two instruction delimiters 23(1) and 25(1). The inventors used a High-Level Data Link Control (HDLC) framer, thus the instruction delimiters 23(1) and 25(1) had a value of "7e". It is noted that other formats of instruction frames can be used. For example, a single instruction delimiter can be required if fixed size instructions are used.

The second group of signals 15(2) includes timing signals and data signals and can be represented by a two dimensional matrix.

It is noted that the first group of signals 15(1) is usually much smaller than the size of the test vector 15, and it usually does not exceed one percent of test vector 15. Conveniently, the size of first group of signals 15(1) is inversely proportional to a dimension of the two dimensional matrix. Thus, it can be inversely proportional to the number of input pins of the tested device or to the length of a first testing period during which test vector 15 is provided to the tested device. Typically, the first group of signals is much smaller than (for example, few percents of the size of) the second group of signals.

Due to the relatively compact size of the first group of signals 15(1) its content is relatively easy to control. Accordingly, the timing of instructions as well as the content of the instructions can be changed dynamically. The inventors generated first group of signals and shifted the instructions within the first group of signals 15(1) between one test iteration to another such as to affect the execution time of certain instructions by the device.

In certain devices the instructions pass through a pipelined path and/or are stored in buffers prior their execution so that the exact timing of instruction execution is hard to predict.

By allowing relatively easy time shifting of instructions within the test vector, the right timing of instruction provision can be determined. The right timing can be determined by examining a test response of the tested device and finding that a required response was achieved (for example—the content of a certain control buffer was changed during a predefined time window).

Figure 2:
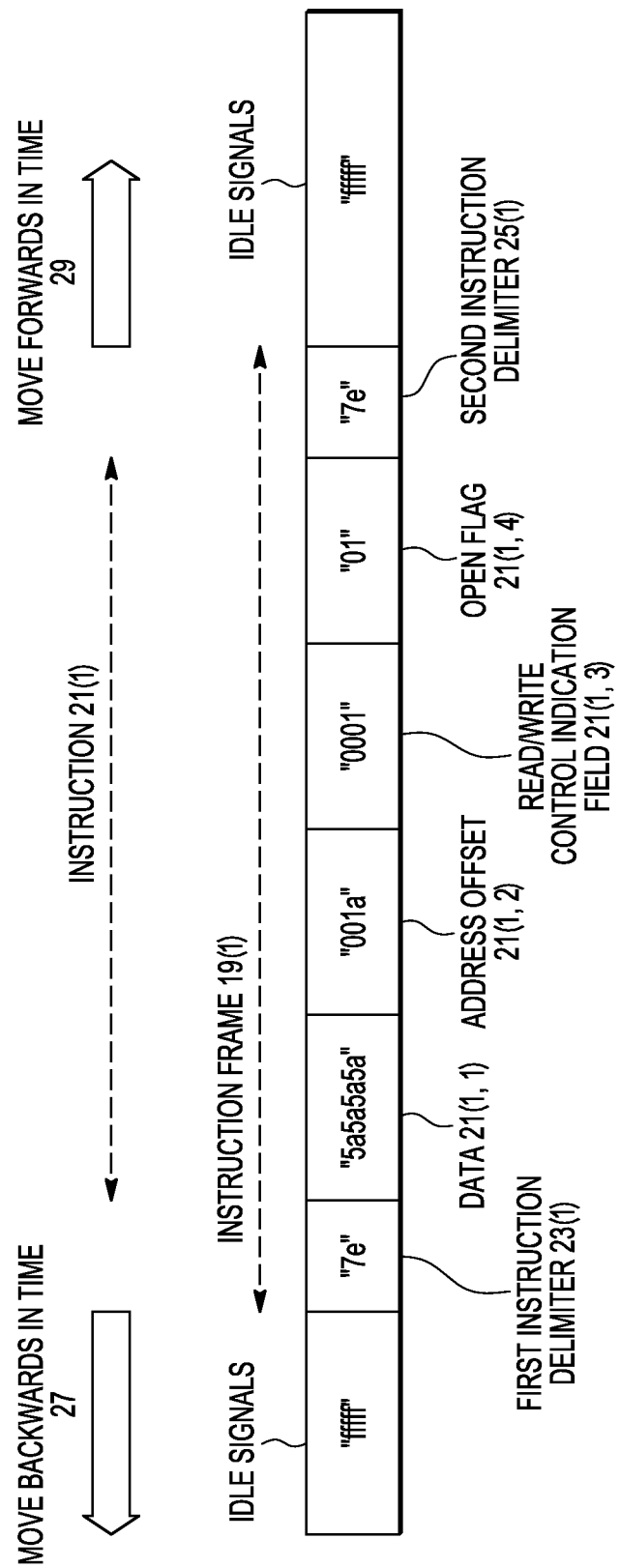
FIG. 2 illustrates an exemplary first group of signals according to an embodiment of the invention.

Referring to FIG. 2, two horizontal arrows 27 and illustrate that the location (and accordingly the timing of provision of) an instruction can be changed from one test iteration to another.

It is noted that FIG. 1 is out of scale and that the first group of instructions 15(1) can be longer than (or shorter than) one dimension of the second group of signals 15(2).

FIG. 2 illustrates an exemplary first group of signals 15(1) according to an embodiment of the invention.

Exemplary instruction frame 19(1) includes: first instruction delimiter 23(1) [value of "7e"], followed instruction 21(1) that in turn is followed by second instruction delimiter 25(1) [value of "7e"]. Instruction 21(1) is an instruction to write data to a certain location in a memory unit (not shown) of device 10.

Instruction 21(1) includes the following fields: (i) data field 21(1,1) that includes data to be written [exemplary value of 5a5a5a5a] during the write operation triggered by instruction 21(1), (ii) address offset field 21(1,2) [exemplary value of 001a] that represents the destination of the data by indicating an offset from a predefine memory address, (iii) read/write control indication field 21(1,3) [exemplary value of 0001 indicating that this is a write operation] indicating whether the instruction is a read or a write instruction, (iv) open flag 21(1,4) indicating whether the instruction 21(1) should be written to a new buffer or to a previously open buffer.

Figure 3:
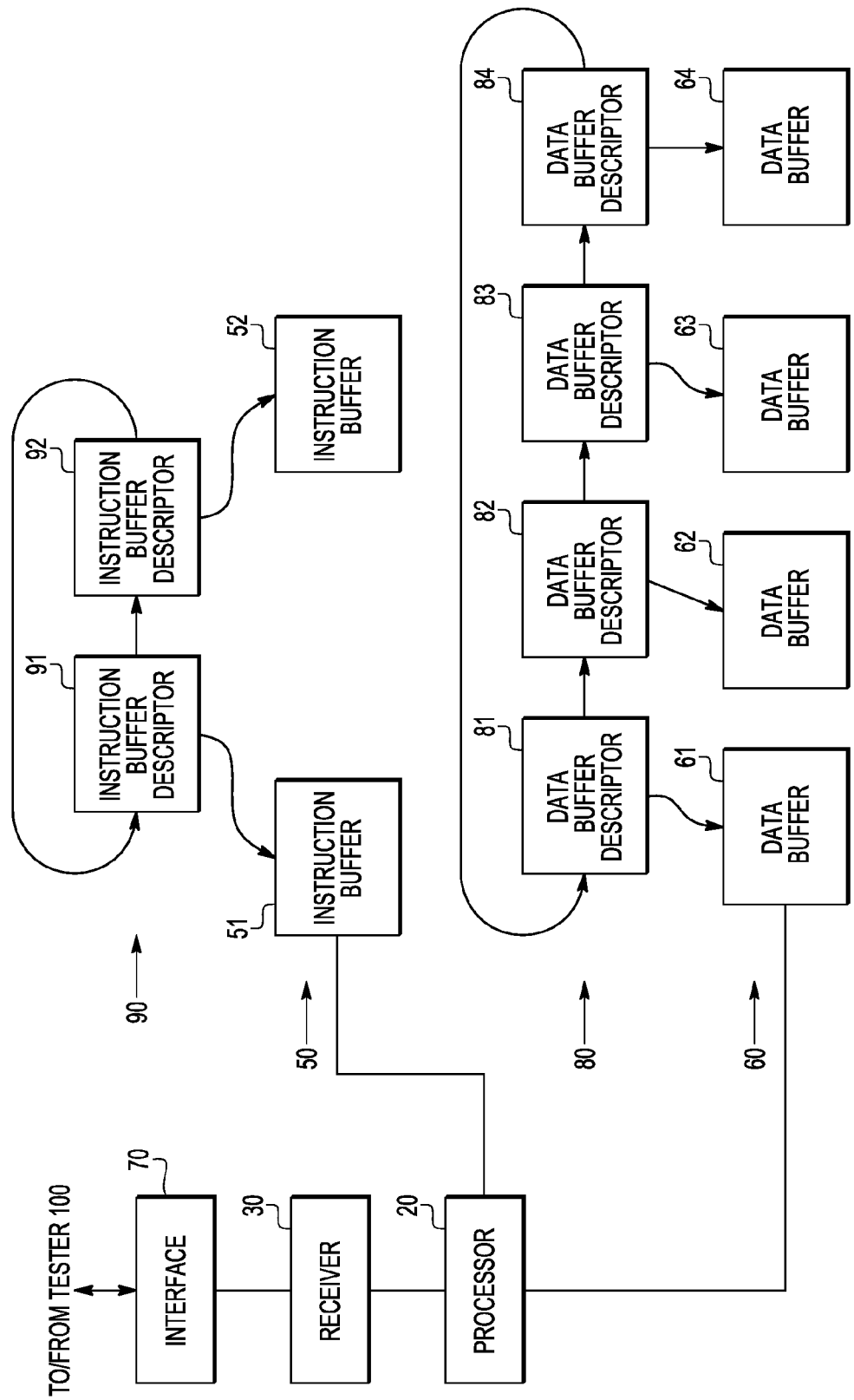
FIG. 3 illustrates a device according to an embodiment of the invention.

FIG. 3 illustrates device 10 according to an embodiment of the invention.

Device 10 can be an integrated circuit, multiple integrated circuits, can include one or more integrated circuits, can be a mobile phone, a communication controller, can be a personal data accessory, a media player, a laptop computer, a desktop computer, a game, an electronic book and the like.

Figure 4:
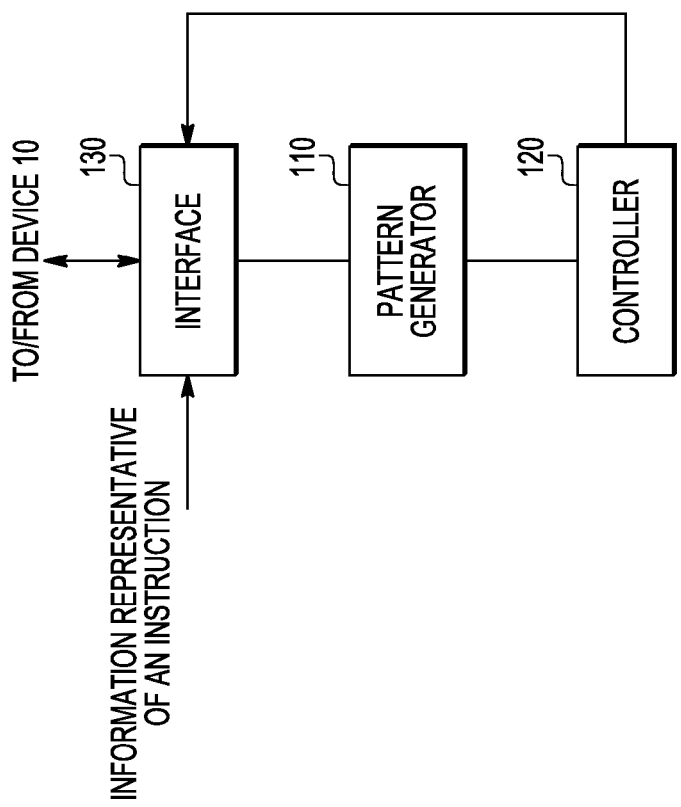
FIG. 4 illustrates a tester according to an embodiment of the invention.

Device 10 is tested by tester 100 that is illustrated in FIG. 4. The tests can be aimed to determine the functionality of device 10 and the like.

The inventors tested a multiple core communication controller that included a pair of reduced instruction set computing (RISC) cores that managed multiple data interfaces of various types as well as a general purpose processor. The multiple core communication controller belongs to the PowerQuiccʊ family of Freescale, although the invention is not limited to devices such as communication controllers. The multiple core communication controller included multiple Time Division Multiplex (TDM) interfaces as well as interfaces of other types.

Device 10 includes processor 20, interface 70, receiver 30, processor 20, one or more instruction buffers (collectively denoted 50), one or more data buffers (collectively denoted 60), and multiple buffer descriptors that may include data buffer descriptors 80 and instruction buffer descriptors 90. Each data buffer descriptor is associated with a data buffer while each instruction buffer descriptor is associated with an instruction buffer. The buffer descriptors are also associated to each other. It is noted that an instruction buffer descriptor can include a flag indicating that it is an instruction buffer descriptor.

The buffers can reside in an internal or external memory unit. The buffer descriptors can reside in an internal or external memory unit.

Conveniently, four data buffers (61-64), four data buffer descriptors (81-84), two instruction buffers (51-52) and two instruction buffer descriptors (91-92) are shown. Processor 20 can access the data and instruction buffers and buffer descriptors. For simplicity of explanation it is illustrated as being connected to data buffer 61 and instruction buffer 51 only.

It is further noted that a buffer descriptor can indicate whether the associated buffer is full, empty, partially full, and the like such buffers and buffer descriptors are available both for the receiver, the transmitter has only data buffers.

Processor 20 usually accesses a buffer descriptor before he accesses the buffer that is linked to the buffer descriptor. The buffer descriptors can be arranged in different manners and the processor can access the buffer descriptors according to various manners known in the art. One exemplary manner to access the buffer descriptors is by polling. Another manner can be based upon interrupt requests that are generated once a buffer is full. It is noted that the buffer descriptors can be arranged in rings and that a certain buffer descriptor ring can include one or more data buffer descriptors and one or more instruction buffer descriptors, but this is not necessarily so. It is noted that in various communication controllers different buffers are allocated for transmitting information while other buffers are allocated for receiving information.

The test vector is provided via multiple pins of device 10. Some of these pins are data input pins and the signals provided via these data input pins are send to buffers.

It is noted that the first group of signals can be provided via one or more pins of device 10 that are dedicated for receiving only the first group of signals, although this is not necessarily so. For example, signals of the first group of signals can be provided via one or more pins that are also used for receiving signals of the second group of signals.

Device 10 and especially processor 20 response to the test vector (first and second group of signals) by outputting a test response. The test response can be represented by a two dimensional matrix, but this is not necessarily so.

Tester 100 of FIG. 4 can evaluate the functionality of device 10 and a user can determine whether the content of the first group of signals was adequate, by analyzing the test response. The test response can be compared to previously acquired test responses, to expected test responses, to statistical information representing current and prior test responses, in order to evaluate the functionality of the device 10.

Conveniently, processor 20 controls the allocation of data and instructions to buffers. The allocation can be responsive to the presence or absence of an instruction type identifier associated with received instructions. Thus, when the instruction type identifier is present the processor 20 will be aware that the received information is an instruction and sent it to an instruction buffer. The input pin can be also dedicated for use as an instruction channel, thus not requiring the instruction type identifier.

Referring to FIG. 4, tester 100 includes interface 130, pattern generator 110 and controller 120. Pattern generator 110 is adapted to generate a second group of signals that includes timing signals and data signals.

Interface 130 is adapted to receive information representative of at least one instruction. This information can be the second group of signals or an instruction or command that generates the first group of signals. For example, the instruction can indicate that a certain information frame should be placed at a certain position within the first group of signals. Idle signals can be provided to tester 100 or generated by tester 100.

Controller 120 is adapted to control a provision of a test vector to tested device 10. The test vector includes the second group of signals and the first group of signals. The first group of signals includes idle signals and at least one information frame.

Conveniently, controller 120 is adapted to evaluate a test response received from tested device 10. The test response is responsive to the test vector that is provided by tester 100 to tested device 10.

Conveniently, tester 100 provides only signals that belong to the first group of signals to a pin of the tested device 10. Conveniently, tester 100 provides signals that belong to the first group of signals and to the second group of signals to a pin of the tested device 10.

Figure 5:
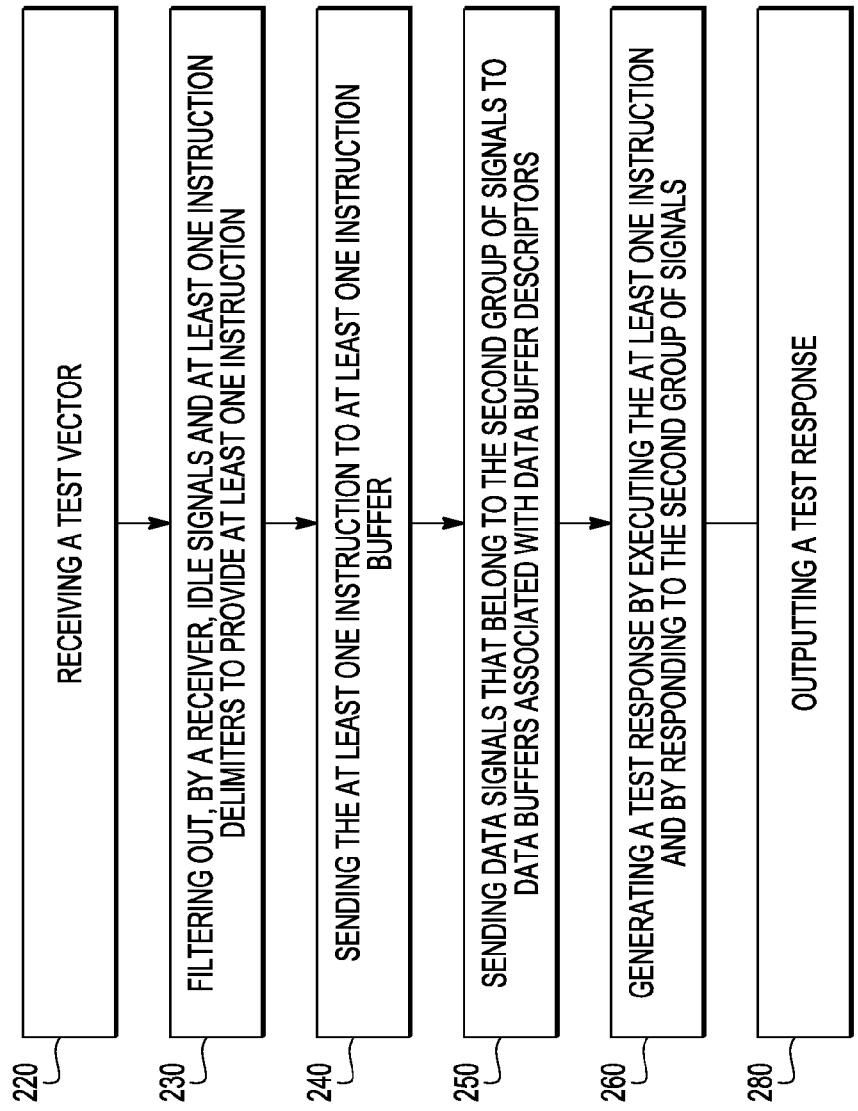
FIG. 5 is a flow chart of a method for testing a device, according to an embodiment of the invention.

FIG. 5 is a flow chart of method 200 for testing a device, according to an embodiment of the invention.

Method 200 starts by stage 220 of receiving a test vector. The test vector includes a first group of signals that includes idle signals and at least one information frame. The test vector also includes a second group of signals that includes timing signals and data signals. The second group of signals can also include control signals.

Stage 220 is followed by stages 230 and 250. Stage 230 involves managing signals of the first group of signals while stage 250 involves managing signals of the second group of signals.

Stage 230 includes filtering out, by a receiver, idle signals and at least one instruction delimiters to provide at least one instruction.

Stage 230 is followed by stage 240 of sending the at least one instruction to at least one instruction buffer.

Stage 250 includes sending data signals that belong to the second group of signals to data buffers associated with data buffer descriptors.

Stages 240 and 250 are followed by stage 260 of generating a test response by executing the at least one instruction and by responding to the second group of signals.

Stage 260 is followed by stage 280 of outputting a test response using a regular data transmitter by lacing the data in it's data buffers.

Conveniently, stage 240 is responsive to an instruction type identifier associated with the instruction.

Conveniently, stage 220 includes receiving, via at least one pin of the tested device, only signals that belong to the first group of signals. According to another embodiment of the invention stage 220 of receiving includes receiving, via at least one pin of the tested device, signals that belong to the first group of signals and to the second group of signals.

It is noted that device 10 of FIG. 3 can execute various stages of method 200 while tester 100 can execute various stages of method 300, although this is not necessarily so.

Figure 6:
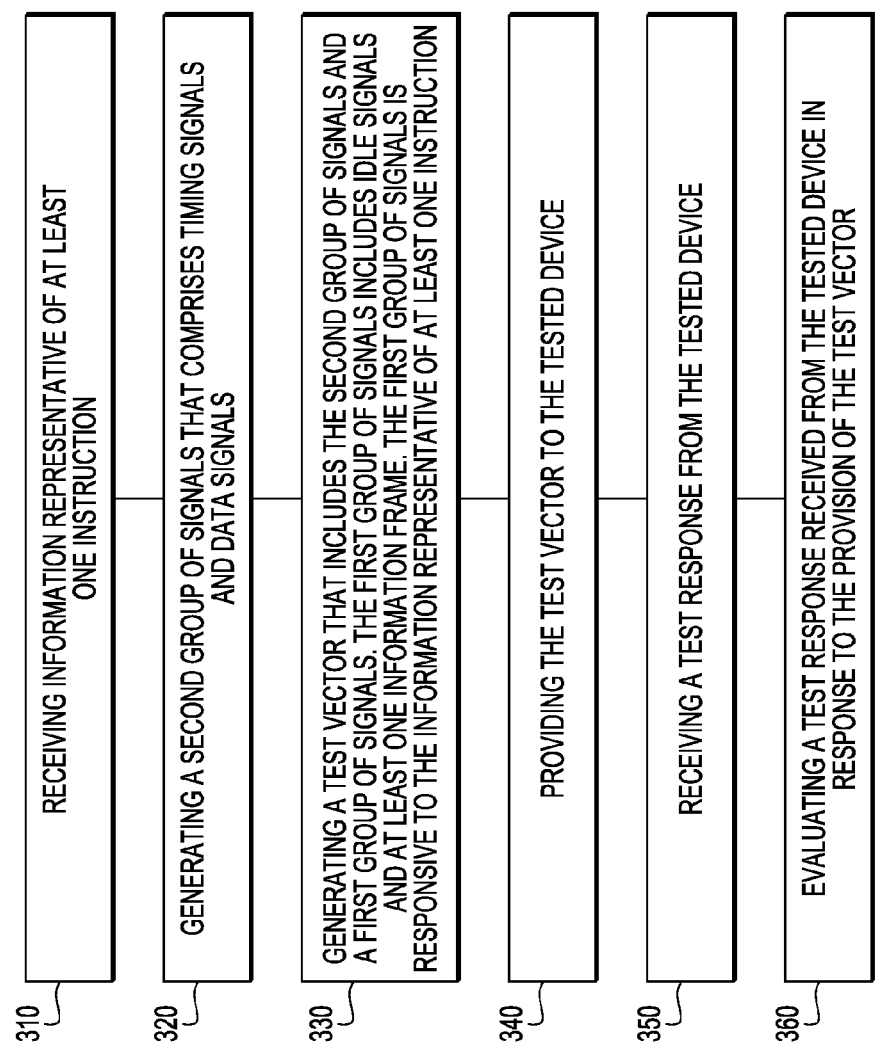
FIGS. 6-8 are a flow chart of a method for testing a device, according to another embodiment of the invention.

FIG. 6 is a flow chart of method 300 for testing a device, according to another embodiment of the invention.

Method 300 starts by stage 310 of receiving information representative of at least one instruction;

Stage 310 is followed by stage 320 of generating a second group of signals that comprises timing signals and data signals.

Stage 320 is followed by stage 330 of generating a test vector that includes the second group of signals and a first group of signals. The first group of signals includes idle signals and at least one information frame. The first group of signals is responsive to the information representative of at least one instruction.

Stage 330 is followed by stage 340 of providing the test vector to the tested device.

Stage 340 is followed by stage 350 of receiving a test response from the tested device.

Stage 350 is followed by stage 360 of evaluating a test response received from the tested device in response to the provision of the test vector.

Figure 7:
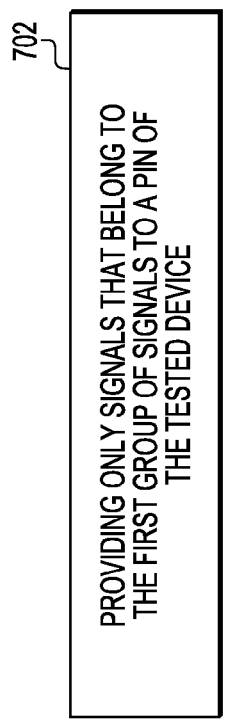
Figure 8:
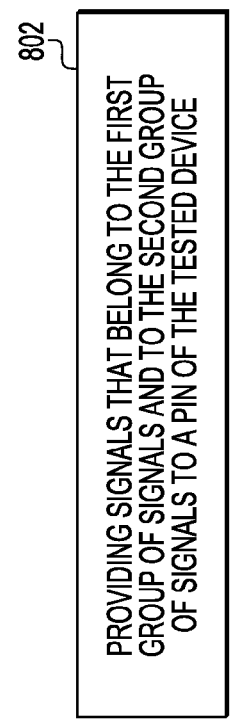

Conveniently, stage 340 includes providing only signals that belong to the first group of signals to a pin of the tested device as shown in stage 702 of FIG. 7. According to another embodiment of the invention stage 340 includes providing signals that belong to the first group of signals and to the second group of signals to a pin of the tested device as shown in stage 802 of FIG. 8.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A device, the device comprises:
   a processor;
   an interface adapted to receive a test vector and to output a test response, wherein the test vector comprises a first group of signals that comprises idle signals and at least one information frame and a second group of signals that comprises timing signals and data signals, wherein a location in time of the at least one information frame with respect to the idle signals of the first group in the test vector is shifted as compared to a location in time of a previous test vector's corresponding at least one information frame with respect to its idle signals, wherein the location in time of the at least one information within the first group of signals does not affect locations in time of the second group of signals with respect to a beginning of the first group of signals; and a receiver, coupled to the interface and to the processor, wherein the receiver is adapted to receive the first group of signals and filter out the idle signals and at least one instruction frame delimiters to provide at least one instruction;

wherein the device is adapted to send the at least one instruction to at least one instruction buffer;

wherein the processor is adapted to execute the at least one instruction stored in the at least one instruction buffer and to respond to the second group of signals such as to provide the test response.

2. The device according to claim 1 wherein the device comprises multiple data buffers and wherein the data buffers are adapted to store multiple data signals of the second group of signals.

3. The device according to claim 1 wherein the processor is adapted to send the at least one instruction to the at least one instruction buffer in response to an instruction type identifier associated with the instruction.

4. The device according to claim 1 wherein the interface comprises at least one pin adapted to receive only signals that belong to the first group of signals.

5. The device according to claim 1 wherein the interface comprises at least one pin adapted to receive signals that belong to the first group of signals and to the second group of signals.

6. A tester that comprises:
   a pattern generator adapted to generate a second group of signals that comprises timing signals and data signals;
   an interface adapted to receive information representative of at least one instruction; and
   a controller adapted to control a provision of a test vector to a tested device;
   wherein the test vector comprises the second group of signals and a first group of signals that comprises idle signals and at least one information frame, wherein a location in time of the at least one information frame with respect to the idle signals of the first group of signals in the test vector is shifted as compared to a location in time of a previous test vector's corresponding at least one information frame with respect to its idle signals, wherein the location in time of the at least one information frame within the first group of signals does not affect locations in time of the second group of signals with respect to a beginning of the first group of signals, and wherein a size of the first group of signals in each of the first test vector is inversely proportional to a number of input pins of the tested device;
   wherein the controller is adapted to evaluate a test response received from the tested device in response to the test vector provided to the tested device.

7. The tester according to claim 6 wherein the tester provides only signals that belong to the first group of signals to a pin of the tested device.

8. The tester according to claim 6 wherein the tester provides signals that belong to the first group of signals and to the second group of signals to a pin of the tested device.

9. A method for testing a device, the method comprises:
   outputting a test response;
   receiving a test vector, wherein the test vector comprises a first group of signals that comprises idle signals and at least one information frame and a second group of signals that comprises timing signals and data signals, wherein a location in time of the at least one information frame with respect to the idle signals of the first group of signals in the test vector is shifted as compared to a location in time of a previous test vector's corresponding at least one information frame with respect to its idle signals, wherein the location in time of the at least one information frame within the first group of signals does not affect locations in time of the second group of signals with respect to a beginning of the first group of signals;
   filtering out, by a receiver, the idle signals and at least one instruction delimiters to provide at least one instruction;
   sending the at least one instruction to at least one instruction buffer; and
   generating the test response by executing the at least one instruction and by responding to the second group of signals.

10. The method according to claim 9 wherein the method comprises sending multiple data signals of the test vector to multiple data buffers.

11. The method according to claim 9 wherein a size of a single instruction frame does not exceed one percent of the test vector.

12. The method according to claim 9 wherein the sending is responsive to an instruction type identifier associated with the instruction.

13. The method according to claim 9 wherein receiving comprises receiving, via at least one pin of the tested device, only signals that belong to the first group of signals.

14. The method according to claim 9 wherein receiving comprises receiving, via at least one pin of the tested device, signals that belong to the first group of signals and to the second group of signals.

15. A method for testing a tested device, the method comprises:
   generating a second group of signals that comprises timing signals and data signals;
   receiving information representative of at least one instruction;
   generating a test vector that comprises the second group of signals and a first group of signals that comprises idle signals and at least one information frame, wherein the first group of signals is responsive to the information representative of at least one instruction, and wherein a location in time of the at least one information frame with respect to the idle signals of the first group of signals in the test vector is shifted as compared to a location in time of a previous test vector's corresponding at least one information frame with respect to its idle signals, wherein the location in time of the at least one information frame within the first group of signals does not affect locations in time of the second group of signals with respect to a beginning of the first group of signals;
   providing the test vector to the tested device; and
   comparing a test response associated with the test vector to a previous test response associated with a previous test vector in order to evaluate a functionality of the tested device, each of the test response and the previous test response received from the tested device in response to a provision of the test vector and the previous test vector respectively.

16. The method according to claim 15 wherein the providing comprises providing only signals that belong to the first group of signals to a pin of the tested device.

17. The method according to claim 15 wherein the providing comprises providing signals that belong to the first group of signals and to the second group of signals to a pin of the tested device.

18. The device according to claim 2 wherein the processor is adapted to send the at least one instruction to at least one instruction buffer in response to an instruction type identifier associated with the instruction.

19. The method according to claim 10 wherein the providing comprises providing signals that belong to the first group of signals and to the second group of signals to a pin of the tested device.

20. The device according to claim 1 wherein the at least one information frame includes start delimiters, an instruction, and end delimiters.

* * * * *

UNITED STATES PATENT AND TRADEMARK OFFICE
CERTIFICATE OF CORRECTION

| | | |
|---|---|---|
| PATENT NO. | : 8,452,553 B2 | Page 1 of 1 |
| APPLICATION NO. | : 12/516319 | |
| DATED | : May 28, 2013 | |
| INVENTOR(S) | : Eran Glickman et al. | |

It is certified that error appears in the above-identified patent and that said Letters Patent is hereby corrected as shown below:

In the Specification:

In Column 3, Line 51, change "arrows 27 and illustrate" to -- arrows 27 and 29 illustrate --

In Column 4, Line 30, change "faces of other types." to -- faces of other types. And TDM interface pins receives signals of the first and second group of signals. --

Signed and Sealed this
Tenth Day of September, 2013

Teresa Stanek Rea
*Acting Director of the United States Patent and Trademark Office*